June 3, 1958 — A. TERRY III — 2,837,191
CENTRIFUGAL POWDER COUPLINGS
Filed Oct. 5, 1955

INVENTOR.
ARTHUR TERRY III
BY William J Fox,
attorney

United States Patent Office 2,837,191
Patented June 3, 1958

1

2,837,191

CENTRIFUGAL POWDER COUPLINGS

Arthur Terry III, Newtown, Conn., assignor to Powdermatic Corporation, New York, N. Y., a corporation of New York Application October 5, 1955, Serial No. 538,744

3 Claims. (Cl. 192—58)

This invention relates to improvements in and relating to centrifugal powder couplings which operate through the intermediary of a granular or powdered material, hereinafter referred to as "powder," which serves to transmit torque between a driving and a driven member when the coupling is in operation. Couplings of this general type have been known in recent years for the transmission of power. However, these couplings have always been a unitary device in which the movements of the parts with respect to each other have been in fixed position, held that way by means of a bearing of one type or another.

It is an object of the present invention to provide a coupling of the centrifugal powder type which would not have any bearings connecting the rotor and the casing members, so that the two members are free to move laterally with respect to each other. It has been discovered that the powder which is located within the casing serves as a stabilizing medium giving the unit a natural self-alignment so that when the unit is slipping—that is, when the rotor is not locked by the powder to the casing—there is a tendency for the unit to align itself properly. This self-alignment is believed to be due to equal pressures existing on both sides of the rotor, making it possible to incorporate a semi-flexible element, thus eliminating the necessity for the rigidity of construction present when bearings are used between the rotor and the casing.

If the rotor is out of alignment at the start-up, the pressure of the powder will soon exceed the pressure of the flexible element, so that the latter absorbs misalignment when running in the locked position with the casing. An alternative, and therefore an improvement, on this generic idea would be the provision of a flexible coupling attached to but outside of the casing and rotor to further absorb the misalignment.

It will be understood that either the casing or the rotor may be the driving member in a coupling of this kind, while the rotor or casing will be the driven member.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

In order that the invention may be well understood, the preferred embodiments thereof will now be described, by way of example only, with reference to the accompanying drawings, in which.

2

Figure 4:
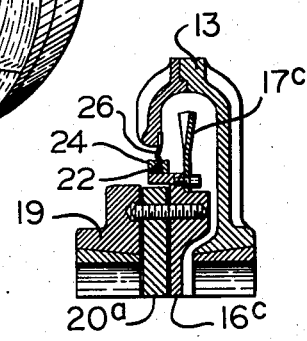

Fig. 4 is a further embodiment of a rotor using an external flexible coupling.

Figure 1:
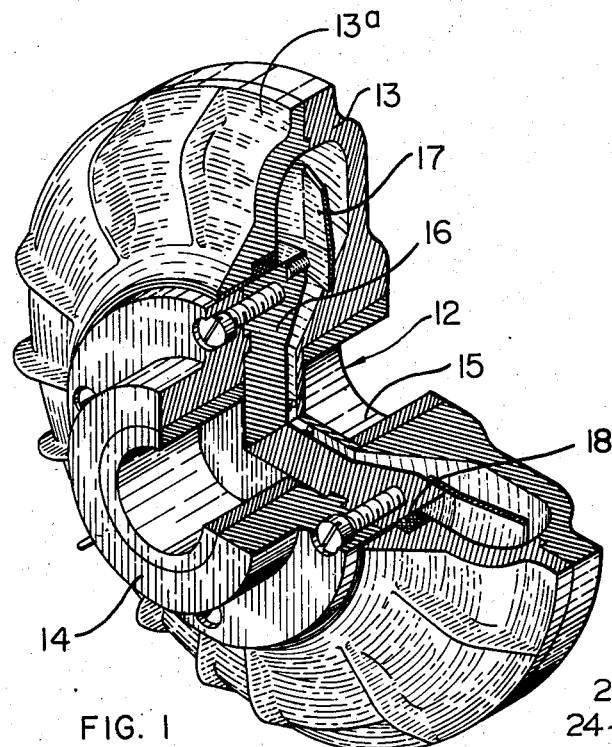
Fig. 1 is a cut-away perspective of a powder coupling of this type.

The coupling shown in Fig. 1 comprises a rotor 12 mounted in a casing 13. The rotor is integrally secured to a locking bearing 14 into which either the driven or the driving shaft (not shown) is to be placed. Casing 13 has a recess 15 adapted to be secured to the other shaft. The rotor 12 comprises central hub 16 and outer undulated flexible plate 17, which is of material that will flex slightly under pressure. The construction of the plate is such that the undulations result in restricted gaps or spaces between the rotor and the casing. A restricted gap on one side of the rotor has a complementary open space or widened space on the opposite side of the rotor.

In operation the powder is thrown toward the periphery of the casing and becomes strongly chocked up between the casing and the protrusions or undulations of the rotor.

The particular coupling covered by this invention is such that the rotor and the casing are not firmly positioned with respect to each other, but are permitted to move laterally by the absence of bearings confining their movement. The only physical connection between the rotor 12 and the casing 13 is felt seal 18, which seal serves to retain the powder in the unit when it is shut down. The felt seal 18 must be resilient so as to absorb any misalignment that occurs.

In operation the rotor would be mounted independently on its shaft and the casing likewise mounted independently on its shaft. If there is any misalignment of the two shafts, this will be reflected in a misalignment of the rotor and the casing. When the unit is started, however, the pressure of the powder on both sides of the rotor and, in particular, on the protrusions of the rotor, tends to cause the rotor plate to flex into a position such as to relieve the effect of this misalignment. At the appropriate speed the powder will lock in place and the unit will run in this misaligned position.

Figure 2:
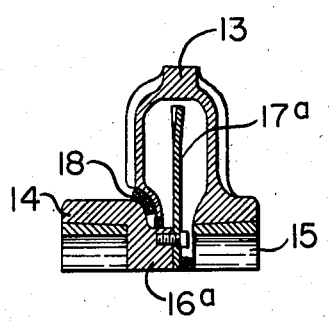
Fig. 2 is a section of a further form of this coupling with a rotor formed from a single sheet.

In Fig. 2 there is shown a further embodiment of this coupling, in which the rotor plate is formed from a single disc, preferably formed from sheet metal, into which are pressed the undulations heretofore referred to. The provision of a flexible disc such as shown in this embodiment permits even greater misalignment without difficulty, as the plate is able to absorb a considerable amount of flexion without damage.

Figure 3:
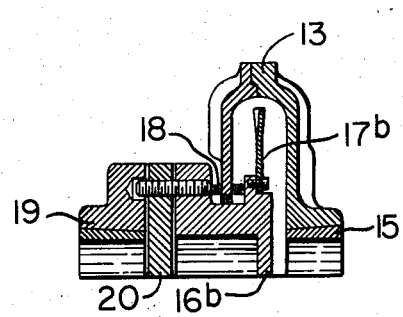
Fig. 3 is a section of a coupling using an external flexible coupling.

A further improvement on the general idea is the provision of a flexible coupling in co-operation with the centrifugal powder coupling, so that the flexible coupling itself might be able to absorb a further amount of the misalignment. The embodiment of this improvement is shown in Fig. 3, in which the rotor hub 16 has mounted on it flexible rotor plate 17b. To increase the flexibility there is provided an extension 19 of the rotor hub 16, which extension is connected to the rotor hub 16 by means of a flexible coupling 20. If the powder coupling is misaligned at the time of start-up, the rotor will tend to overcome this misalignment and to align itself parallel to the axis of the casing, with the misalignment being absorbed by the flexible coupling. If the flexible coupling is not able to absorb all the misalignment, part of it can be absorbed by the flexing of the rotor blade 17b into a new position in which it will be locked when the powder becomes chocked up at the appropriate spot.

A further embodiment is shown in Fig. 4, in which the flexible coupling 20a is mounted in a narrow rotor hub 16c, on which is mounted undulated rotor blade 17c. As in the embodiment of Fig. 3, the misalignment would be absorbed by the combination of the flexing developed in rotor blade 17c and the flexing developed in flexible coupling 20a. The powder is prevented from escaping from the unit by felt seal 22 in metal collar 24. The collar is held in place by flexible diaphragm 26.

I claim:

1. A centrifugal powder coupling comprising a rotatable casing serving to contain a quantity of powder and enclosing a rotor mounted coaxially with said casing, in which the rotor has, on each of its sides, a plurality of regularly spaced corrugations, protrusions between said corrugations on at least one of said surfaces being closely adjacent an opposed surface of the casing to provide a series of restricted spaces in which during operation powder may accumulate to provide a driving connection between the rotor and the casing, the said corrugations extending substantially radially of the rotor and each having at least one of its edges located in or inclined to a plane perpendicular to the axis of the rotor, a first shaft on which the casing is mounted, a second shaft on which the rotor is mounted, the rotor laterally movably mounted within the casing so as to move laterally as well as rotatably with respect to each other to permit self-alignment during operation.

2. A centrifugal powder coupling according to claim 1, in which at least one of the rotatable elements is connected to a flexible coupling.

3. A centrifugal powder coupling according to claim 1, in which a resilient means is provided between the casing and the rotor to position them axially with respect to each other.

References Cited in the file of this patent

FOREIGN PATENTS 1,077,609     France _____ May 5, 1954

OTHER REFERENCES

Dodge: Bulletin A–640, June 1955.